United States Patent Office 3,549,505
Patented Dec. 22, 1970

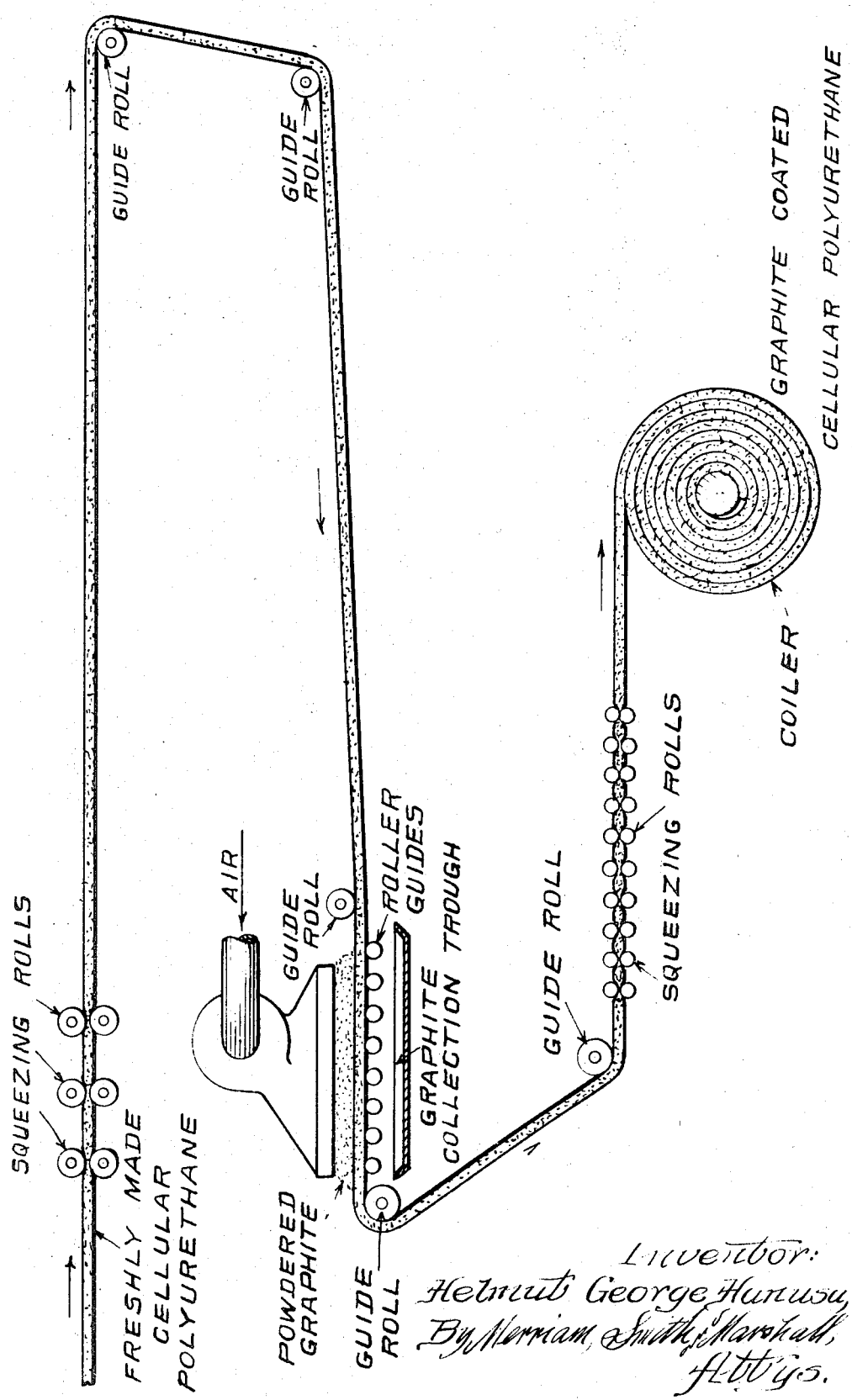

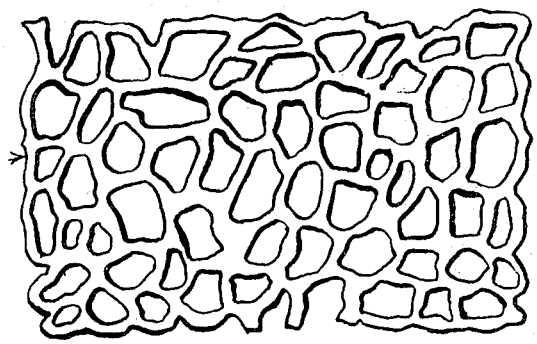
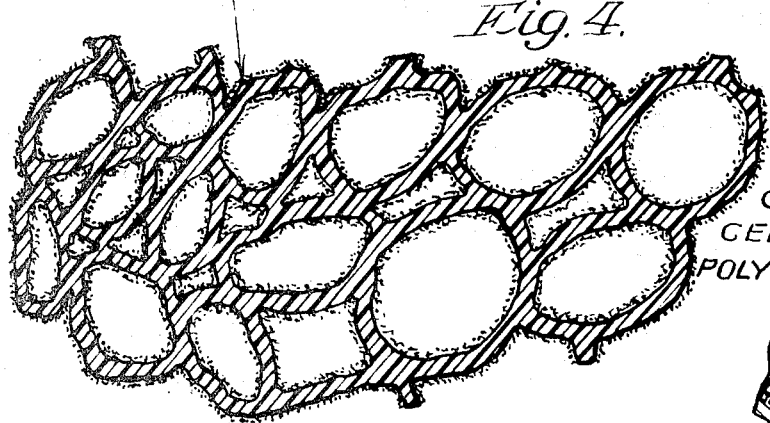
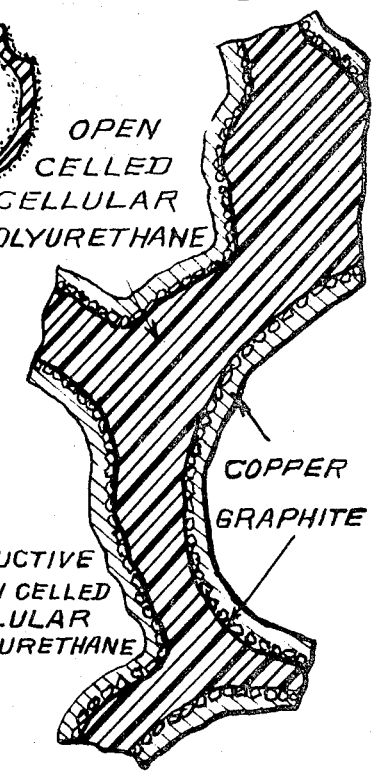
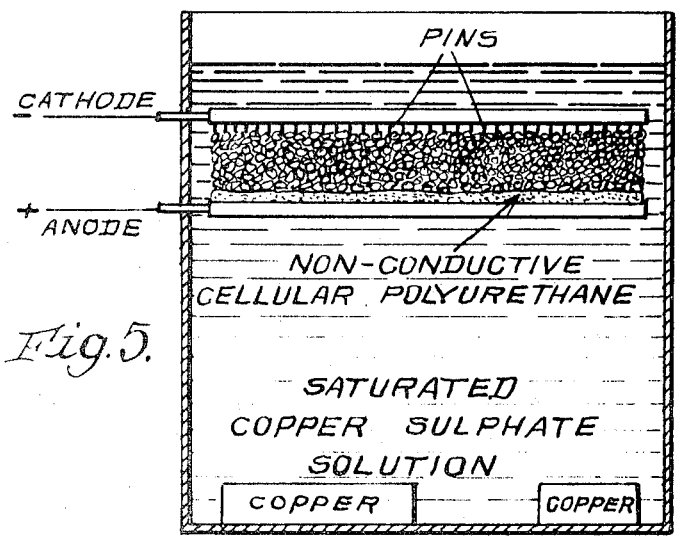

3,549,505
RETICULAR STRUCTURES AND METHODS OF PRODUCING SAME
Helmut G. Hanusa, 428 S. Missouri,
Cape Girardeau, Mo. 63701
Continuation-in-part of application Ser. No. 533,728, Mar. 11, 1966, which is a continuation-in-part of application Ser. No. 235,041, Nov. 2, 1962, which in turn is a continuation-in-part of application Ser. No. 90,076, Feb. 17, 1961. This application Jan. 9, 1967, Ser. No. 620,578
(Filed under Rule 47(b) and 35 U.S.C. 118)
Int. Cl. C23b 5/64, 7/00
U.S. Cl. 204—11                                           9 Claims

ABSTRACT OF THE DISCLOSURE

A method of producing a substantially rigid, reticular, three-dimensional network of metallized polyurethane having macroscopic inter-connected voids therein, by first forming a reticular, electrically nonconductive, cellular structure of polyurethane having a self-supporting, three-dimensional nework of inter-connected annulets with macroscopic interconnected voids therein and having at least 98% of all cells opened, then coating the annulets throughout the network with conductive material, and finally, electrolytically depositing an adherent metal coating onto and substantially throughout the reticular conductive structure and the desired product having the polyurethane destroyed by heating.

---

This application is a continuation-in-part of copending application Ser. No. 533,728, filed Mar. 11, 1966, which is a continuation of copending application Ser. No. 235,-041, filed Nov. 2, 1962, which is in turn a continuation-in-part of my copending application Ser. No. 90,076, filed Feb. 17, 1961, all the above applications are now abandoned.

This invention relates to methods of metallizing a reticular structure formed of annulets of cellular polyurethrane and the products thereof and produced therefrom.

Despite the continued need for light weight supporting structures having both good strength and heat transfer properties, no effective method has heretofore been used that involves the use of metallized cellular polyurethane depite the well known lightness and load supporting capabilities of cellular polyurethane.

I have discovered a method of producing a new light product having outstanding heat transfer and load supporting properties that involves producing cellular polyurethane comprising a self-supporting, open-cell, flexible reticular structure formed of annulets, depositing electrically conductive material on all of the surfaces of the nonconductive annulets, and metallizing with an adherent metal the conductive annulets throughout the entire reticular structure to produce a rigid structure.

In accordance with my invention flexible cellular polyurethane, such as flexible, cellular polyester polyurethane having communicating or discontinuous cells, is formed comprising self-supporting, resilient open-cell reticular structure. The resulting structure comprises a 3-dimensional network having interconnected voids throughout the mass and self-supporting strands defining reticular annulets that outline the cells. In the preferred embodiment of the invention, the polyurethane foam prior to being completely cured is subject to compression to rupture the cells without causing the collapse of the annulets that form the remaining reticular structure. The structure of the cellular polyurethane may be so modified, for example, by passing the cellular mass between a plurality of rolls. If the rupturing operation is performed after the polyurethane foam has been cured completely, the form will shrink and consequently lose its desirable properties. Rupturing is therefore conducted when the polyurethane foam is not sufficiently tacky to interfere with the operation. The resulting resilient reticular structure has not less than 98% of all the cells open thereby forming interconnected voids that provide ready access to the individual non-conductive annulets. The rupturing operation does not materially alter or affect the density of the cellular polyurethane which desirably is 1.5–3 lbs./ft.$^3$. The average diameter of the resulting annulets does not vary substantially from the average diameter of the individual cell walls of the starting cellular polyurethane material, although it is somewhat larger than the original average diameter.

Where desired, the polyurethane foam may be produced according to known methods which yield directly an open-cell, reticular structure. In this manner, the rupturing operation may be eliminated.

In order to metallize the electrically nonconductive reticular structure of skeletonized cellular polyurethane by electrodepositing metal on it, the entire network of annulets must first be made conductive by coating them with an electrically conductive material such as dry, finely divided, graphite or iron, although the former is preferred. Any finely powdered metal can be used provided it is electrically conductive and is not attacked or destroyed by the plating bath solutions. The coating operation is facilitated by the previous modification of the cell structure, and may be accomplished by spraying dry, finely divided, conductor material onto the resilient reticular structure and effecting distribution of the conductor material onto the annulets throughout the mass by a kneading action.

Another efficacious and convenient method of imparting electrical conductivity to the normally non-conductive urethane foam is to treat it with certain metal salt solutions in the presence of a reducing agent whereby the metal salt is reduced with concomitant deposition of the metal onto the foam plastic surface. A suitable and known procedure consists in treating the cleaned urethane foam with successive solutions of stannous chloride, palladium chloride and a metal salt solution such as a solution of nickel chloride or sulfate. The metal salt is reduced and the metal deposits throughout the reticular structure of the foam. The conductive foam can then be plated in the manner described herein.

The metallizing of the conductive reticular structure may then be carried out in an electroplating cell. The previous modification of the cell structure provides ready access for the coating ions and enables the entire reticular structure to be substantially uniformly coated with adherent metal. Metals which firmly adhere to the conductive annulets, such as copper, nickel, iron, chromium, and the like, may be deposited on the reticular conductor. For example, after the reticular conductor structure has been coated with copper (e.g., in copper sulphate solution), the metallized structure may be used as the cathode in another cell and coated with a different metal; however, when iron is to be deposited on the reticular conductor material, it should be deposited on the material prior to copper and not vice versa.

The heat transfer properties of the metallized, skeletonized cellular polyurethane may be improved by heating the metallized reticular structure at temperatures (e.g., about 600° to 800° F.) that are sufficiently high to destroy or decompose the underlying skeletonized polyurethane or passing the metallized structure through an open flame.

The resulting metallized reticular structure may be used in the aircraft or missile industry as a light weight, heat conductive, supporting structure. It can be used for sandwich construction because it can be soldered, welded, glued or electroplated into structures. For example, the metallized reticular structure could be used within the confines of an aircraft wing as a support for the metal skin. Further the reticular structure produced from heating the rigid, metallized skeletonized cellular polyurethane can be used, with great effectiveness, in a similar manner in the nose cone of a missile because its heat conductive properties will serve to obviate the collapse of metal skin at high temperatures. Still further, it could be used as a filtering medium, or as the reflective material of a radar mirror.

In the accompanying diagrammatic drawings:

FIG. 1 illustrates a preferred continuous method for producing a self-supporting, resilient sheet of graphite coated, cellular polyurethane;

FIG. 5 shows metallizing the graphite coated product to produce a metallized product comprising an integral reticular network formed of metal annulets;

FIGS. 2 and 3 show the resilient reticular sheet, FIG. 3 being a 4:1 enlargement of FIG. 2; and FIGS. 4 and 6 are enlarged fragmentary views showing the resilient, self-supporting cellular polyurethane product after its reticular structure has been made electrically conductive by being coated with finely divided graphite.

The resilient cellular polyurethane sheet material that is treated in accordance with the method shown in FIG. 1 may be made from reaction products of polymeric materials with reactive hydroxyl groups or hydrogen atoms, such as linear or branched polyesters, with polyisocyanates, by using blowing agents or reacting these products with water or compounds (e.g., the polyester may contain both reactive terminal hydroxyl and carboxyl groups) containing reactive COOH groups.

For example, cellular polyurethane may be produced by reacting a polyester component containing a polyester resin (e.g., condensation product of polyhydric alcohol and polycarboxylic acid), water, catalyst, and preferably, an emulsifier with a diisocyanate component. Cellular polyurethane may also be produced by reacting a polyester resin with a sufficient amount of diisocyanate so as to make a prepolymer containing unreacted NCO groups; the prepolymer may then be reacted with water or a water-catalyst mix to produce a cellular reaction product.

The polyester resin may be the reaction product of a polyhydric alcohol and polybasic acid unmodified or modified with oil and/or other resins, and the like. For example, a suitable polyester resin may be produced by reacting saturated acids such as adipic acid with diethylene glycol and trimethylol ethane. Unsaturated dibasic acids could be wholly or partially substituted for the saturated acid, but tend to produce a polyurethane foam that possesses comparatively less durability on aging.

Insoluble, inert additives such as hydrated silica pigment or ferric oxide may be incorporated into the polymericisocyanate mix in order to produce cellular polyurethane foams having cells of the desired size. Further, conductive materials such as finely divided graphite, aluminum or copper may be incorporated into the liquid reaction mixture so as to facilitate the electroplating of the reticular structure.

Polyisocyanates, such as toluene diisocyanate, may be used in forming the cellular polyurethane.

The liquid, foamable polymeric-diisocyanate mix may be formed in and ejected from a mixing device such as described in U.S. Pat. 2,764,565, and the composition of Example 2 of that patent may be used. The resulting cellular polyester polyurethane may then be treated in the manner indicated in FIG. 1.

Referring to FIG. 1, a resilient sheet of solid, cellular, polymeric polyester polyurethane having been cured beyond the tacky state is compressed by passing between three pairs of driven rolls, and is permitted to resiliently expand to its normal thickness after passing between each pair of rolls. The polyurethane sheet may then be slit to the desired thickness. For purposes of later processing, the polyurethane might, for example, have a thickness of about ⅛ inch to 3 inches or more. Polyurethane should have a density of 1.0–5 lbs./ft.$^3$. The compression operation results in a structure having not less than 98% of all the cells opened, and there is no material change in the density of the cellular polyurethane.

The ruptured sheet of cellular polyurethane is then guided by rolls to the graphite coating operation, where finally divided particles of graphite that are propelled by air are blown onto the polyurethane lattice. A graphite collecting trough is positioned below the polyurethane to permit the recovery of unused graphite.

The graphite coated polyurethane material is then passed between a series of driven squeezing rolls or wringers which serve to distribute the graphite throughout the thickness of the skeletonized cellular polyurethane material, thereby uniformly coating the self-supporting reticular annulets of the polyurethane product to produce an electrically conductive product such as illustrated in FIGS. 4 and 6.

The graphite coated cellular polyurethane material is then ready to be metallized; however, it may be first stored by coiling it in the manner illustrated.

When one wishes to metallize the graphite coated reticular product, one may remove a desired length of material from the coil and place it in a metallizing bath containing copper sulphate, for example, such as shown in FIG. 5.

Referring to the metallizing (i.e., copper) cell shown in FIG. 5, the reticular polyurethane product produced above and illustrated in FIGS. 3 and 4 is immersed in a saturated copper sulphate solution, and is placed between cathode and anode plates so that the product contacts the cathode. Because of the buoyant nature of the product, nonconductive positioning means may be used so as to maintain the product in contact with the cathode. For example, as shown in FIG. 5, a thin, highly porous sheet of cellular polyurethane (not treated with conductive material) may be placed between the product and the anode plate. The lowermost surface of the cathode is coated with insulating material such as insulation lacquer, but has a plurality of evenly distributed non-insulated pins that are equally spaced from each other and which extend upwardly from the plate into the reticular polyurethane structure. The spacing of these pins and their length should be correlated so as to afford economical metallization of the entire reticular structure. For example, satisfactory results may be obtained in a copper sulphate solution when pins or needles of about ⅛–¼ inch in length spaced about ¼–½ inch apart pierce a reticular polyurethane sheet about 1 inch thick.

In operation, the Cu++ ions are attracted to and deposited on the negatively charged reticular polyurethane, thereby removing copper from the solution and providing $H_2SO_4$. By using a copper anode or having copper metal in the cell, the $SO_4^=$ ions remove copper and the concentration of the solution remains constant.

In the electroplating step, it is important to achieve a uniform deposition of metal coating throughout the reticular structure. For this purpose, the electroplating bath is provided with a suitable pumping means, such as an impeller (not shown), to circulate the solution into the interior of the reticular structure. Also, the electric current is pulsated, desirably at about 10 seconds intervals. Hence, when the current is off, fresh or replenished solution is circulated uniformly throughout the reticular structure. When the current again flows, there will result a uniform deposition of metal. If the current flowed continuously, the fresh solution would be concentrated on or near the exterior surfaces of the reticulated structure, and the solution in the interior of the structure would be relatively dilute in metal ions. Therefore, a uniform deposition of metal is achieved by pulsating the electric current.

The metallized reticular structure is then ready for use, as described above.

The following examples serve to illustrate an embodiment of my method of producing rigid, metallized, skeletonized cellular polyurethane:

EXAMPLE I

An admixture is prepared of 100 parts by weight of "Emery 3201–D" (lower alkylene glycol ester of dimer acid having 18 carbon atoms, i.e., linoleic acid; M.W. 2,000; Acid No. 2; Hydroxyl No. 60; Viscosity at 25° C.—10,000 cps.), 1.4 parts by weight of triethylamine, 0.2 part by weight of "A–3" (N-diethylolamide), and 2.7 parts by weight of water. Where desired "Witco Fomrez 1058" (blend of anionic and nonionic wetting agents), may be substituted for the "A–3."

36 parts by weight of "Mondur TD–80" (80% 2,4 tolylene diisocyanate and 20% 2,6 tolylene diisocyanate), are added to the admixture to provide a cellular polyurethane reaction mixture.

After the cellular polyurethane reaction mixture has foamed into a sheet of tacky, flexible cellular polyurethane having closed cells of uniform size, a low density and a thickness of about 10 inches, but before it has completely cured (e.g., 15–20 minutes), it is passed between a series of squeezing rolls of a calender mill that compresses the sheet to about 80–90% of its thickness. This ruptures the cell membranes and causes the broken cell walls to retract.

EAMPLE II

An admixture is prepared of 90 parts by weight of castor oil, 10 parts by weight of "Unitol" (tall oil), 0.5 part by weight of "Dabco" (triethylene diamine), 0.4 part by weight of "T–18" (stabilized stannous oleate), 1 part by weight of N-ethyl morpholine, 4.5 parts by weight of water, and 1 part by weight of "Silicone L–520" (polysiloxane oxyalkylene block copolymer disclosed in U.S. Patents 2,834,748 and 2,917,480).

65 parts by weight of "Mondur TD–80" (80% 2,4 TDI and 20% 2,6 TDI) are added to the admixture to provide a cellular polyurethane reaction mixture.

The cellular polyurethane reaction mixture foams into a sheet of flexible cellular polyurethane having open cells of uniform size and a density of about 1.2 pcf. There are about 40–45 cells per inch.

EXAMPLE III

An admixture is prepared of 90 parts by weight of castor oil, 10 parts by weight of "Unitol" (tall oil), 0.45 part by weight of "Dabco" (triethylene diamine), 0.2 part by weight of "T–9" (stabilized stannous octoate), 0.7 part by weight of N-ethyl morpholine, 3 parts by weight of water, and 0.8 part by weight of "Silicone L–520" (polysiloxane oxyalkylene block copolymer disclosed in U.S. Patents 2,834,748 and 2,917,480).

50 parts by weight of "Mondur TD–80" (80% 2,4 TDI and 20% 2,6 TDI) are added to the admixture to provide a cellular polyurethane reaction mixture.

The cellular polyurethane reaction mixture foams into a sheet of flexible cellular polyurethane having open cells of uniform size and a density of about 1.7. There are about 30–35 cells per inch.

EXAMPLE IV

This example illustrates the production of metallized urethane foam wherein the foam is rendered conductive by applying a metal coating thereto.

(1)

(a) Immerse foam in alkaline bath composed of 88 parts of potassium hydroxide in 788 parts water. Bath temperature is 140° F.

(b) Knead foam in the solution for 10 minutes.

(c) Remove foam from alkaline bath and wash thoroughly in tap water.

(d) Remove foam from water, pass through squeeze rolls and immerse in 2% aqueous acetic acid solution and knead for 5 minutes.

(e) Remove foam from acid solution, pass through squeeze rolls to remove excess solution.

(f) Wash thoroughly in tap water while kneading.

(g) Remove from water and pass through squeeze rolls to remove water.

(h) Dry 2 hours at 248° F.

(2)

The above prepared electrically nonconductive reticular structure of polyurethane foam was made conductive by depositing thereon a thin film of nickle by means of the procedure given below:

(a) Immerse foam in solution of 10% stannous chloride for 1.5 minutes.

(b) Remove and wash thoroughly with tap water, and allow excess water to drain from stock.

(c) Immerse in solution of palladium chloride (1.0 g./l.) for 1.5 min. (solution temperature 90° F.).

(d) Remove and wash thoroughly in tap water.

(e) Remove excess water from foam.

(f) Immerse in solution of 10% nickel sulfate hydrate at 110° F. approximately 1–3 min. to produce continuous coating. Do not flex foam after the start of this step.

(g) Wash thoroughly in tap water and drain.

(3)

Electroplating process (a) Plating solution and concentration:
Copper sulfate ($CuSO_4$—$5H_2O$)—800 gm.
Sulfuric acid (36 N)—200 gm.
Water—3900.

(b) Plating bath temperature—100–110° F.

(c) Amperage—1½–3 amps per cu. in. foam.

(d) Pulse—time current on 3 sec., time current off 7 sec.

(e) Time in plating process—6 to 40 hrs., depending on deposit required.

(f) Electrode construction:
  (a) Anode—copper plate.
  (b) Cathode—multi probes piercing foam.

(4)

Foam plated: 3007 Polyester, 4 lb. density and 15 cells per linear inch.

The treatment of non-conductive bodies with solutions of stannous chloride, palladium chloride and a metal salt such as a nickel salt to render the bodies conductive is known as the electroless metal plating process and is described in the technical literature. A typical reference is Publication Number 265 by the American Society for Testing Materials, 1916 Race Street, Philadelphia 3, Pa.

The foregoing detailed description has been given for clearness of understanding only, and no unnecessary limitations should be understood therefrom, as modifications will be obvious to those skilled in the art.

What is claimed is:

1. A method of producing substantially rigid, metallized cellular polyurethane which comprises, forming a reticular, electrically nonconductive, cellular structure of polyurethane having a self-supporting, three-dimensional network of inter-connected annulets with macroscopic interconnected voids therein and having at least 98% of all cells opened, coating the annulets throughout the network with conductive material, and electrolytically depositing an adherent metal coating onto and substantially throughout the reticular conductive structure to form a substantially rigid, reticular, three-dimensional network of metallized polyurethane having macroscopic interconnected voids therein.

2. A method of producing substantially rigid, reticular metal structural having a three-dimensional network of inter-connected metal annulets having inter-connected macroscopic voids therein which comprises, forming a reticular, electrically nonconductive, cellular structure of polyurethane having a self-supporting, three-dimensional network of inter-connected annulets with inter-connected macroscopic voids therein and having at least 98% of all cells opened, coating the annulets throughout the network with conductive material, electrolytically depositing an adherent metal coating onto and substantially throughout the reticular conductive structure to form a substantially rigid, reticular, three-dimensional network of metallized polyurethane having macroscopic inter-connected voids therein, and destroying the polyurethane structure of said metallized reticular structure without destroying the network of inner-connected metal annulets.

3. The method of claim 2 wherein the polyurethane structure is destroyed by heating.

4. A method of producing substantially rigid, metallized cellular polyurethane which comprises, preparing a polyurethane foam, rupturing the cells of said foam before it has been completely cured to form a reticular, electrically nonconductive, cellular structure of polyurethane having a self-supporting, three-dimensional network of inter-connected annulets with macroscopic, inter-connected voids therein, said structure characterized by having at least 98% of all cells opened and by having a density substantially equal to that of the foam prior to said rupturing, coating the annulets throughout the network with conductive material, and electrolytically depositing an adherent metal coating onto and substantially throughout the reticular conductive structure to form a substantially rigid, reticular, three-dimensional network of metallized polyurehane having macroscopic inter-connected voids therein.

5. A substantially rigid, open-celled, mass of metallized, cellular polyurethane, which comprises a reticular, three-dimensional network of inter-connected annulets having inter-connected macroscopic voids therein, formed upon rupturing of said cellular polyurethane and characterized by having not less than 98% of all cells opened, said annulets of said cellular polyurethane having an adherent coating of metal thereon.

6. A substantially rigid, open-celled, mass of metallized, cellular polyurethane, which comprises a reticular, three-dimensional network of inter-connected annulets having inter-connected macroscopic voids therein, and characterized by having not less than 98% of all cells opened, said annulets of said cellular polyurethane having an adherent coating of metal thereon.

7. A substantially rigid, open-celled, reticular metal mass comprising a three-dimensional network of inter-connected metal annulets throughout the mass having macroscopic interconnected voids therein, said network produced by a method which comprises heating an open-celled, metallized, cellular polyurethane network to destroy the self-supporting polyurethane structure thereof without destroying the network of inter-connected metal annulets.

8. Method according to claim 1 wherein said metal coating step comprises electroplating from a solution containing a salt of the metal to be coated, and includes pulsating the electric current at regular intervals whereby the current flows intermittenly to the solution.

9. Method according to claim 3 wherein said metal coating step comprises electroplating from a solution containing a salt of the metal to be coated, and includes pulsating the electric current at regular intervals whereby the current flows intermittently to the solution.

References Cited

UNITED STATES PATENTS

| | | | |
|---|---|---|---|
| 2,451,341 | 10/1948 | Jernstedt | 204—228 |
| 2,474,502 | 6/1949 | Suchy | 204—20 |
| 2,694,743 | 11/1954 | Ruskin et al. | 204—20 |
| 2,932,609 | 4/1960 | Pierce | 204—20 |
| 2,955,056 | 10/1960 | Knox | 117—98 |

OTHER REFERENCES

Don't Overlook Electroforming, Product Engineering June 5, 1961, pps. 609–614.

JOHN H. MACK, Primary Examiner

T. TUFARIELLO, Assistant Examiner

U.S. Cl. X.R.

204—20, 22, 28